Patented Jan. 11, 1938

2,104,960

UNITED STATES PATENT OFFICE 2,104,960

PROCESS FOR THE MANUFACTURE OF DIHYDROXY ISODIBENZANTHRONE

Robert Fraser Thomson, Ian Blohm Anderson, and Sidney Thornley, Grangemouth, Scotland, assignors to Imperial Chemical Industries Limited, a corporation of Great Britain No Drawing. Application July 18, 1936, Serial No. 91,440

2 Claims. (Cl. 260—61)

This invention relates to improvements in the process for preparing oxidation products of isodibenzanthrone.

U. S. Patent Reissue 16,426 describes the oxidation of isodibenzanthrone in strong sulfuric acid with manganese dioxide at 60° C. The resulting product after being treated with sodium bisulfite is methylated to give a dyestuff which dyes cotton from a blue vat in greenish-blue shades. When the methylation is carried out in nitrobenzene, according to the procedure outlined in Example B of the patent, a relatively pure dyestuff crystallizes out (dimethoxy-isodibenzanthrone) if the nitrobenzene filtrate is allowed to cool before it is concentrated. This pure dyestuff dissolves in concentrated sulfuric acid with a claret color, while the impurities which remain in the nitrobenzene solution and which may be obtained on further concentration of such solution dissolve in sulfuric acid with a green color. These impurities, if precipitated with the dimethoxy-isodibenzanthrone from the nitrobenzene solution, tend to dull the shades of the dyestuff and the resulting product gives a green sulfuric acid solution.

In German Patent 468,957 a process is described wherein isodibenzanthrone is oxidized in sulfuric acid monohydrate or oleum at low temperature. The oxidation of isodibenzanthrone according to this patent gives very low yields of the desired blue dyestuff when methylated according to the procedure outlined in the patent, making the process impractical for commercial use.

It is therefore an object of this invention to provide a process for oxidizing isodibenzanthrone whereby a product may be obtained which on subsequent methylation will give relatively high yields of a dyestuff which dyes cotton in desirable greenish-blue shades.

It is a further object of this invention to improve the process for oxidizing isodibenzanthrone described in U. S. Reissue 16,426 whereby increased yields of a relatively pure oxidation product of isodibenzanthrone are obtained.

According to this invention isodibenzanthrone is suspended in moderately dilute sulfuric acid and subjected to the action of an oxidizing agent, such as manganese dioxide, at ordinary room temperature or lower.

To more fully illustrate the invention the following example is given in which the parts used are by weight.

Example 100 parts of finely powdered isodibenzanthrone (obtained, for example, according to U. S. Patent 1,924,456, Ex. 5) are suspended in 2,000 parts of 92% sulfuric acid at ordinary temperature with stirring, and after cooling to 10 to 15° C. 130 parts of finely powdered natural manganese dioxide (85–86% $MnO_2$) are added in small portions during the course of 2 to 3 hours, followed by stirring for 15 to 16 hours at the same temperature. The reaction mixture is then allowed to warm up to 20 to 25° C. and drowned in 10,000 parts of water. The brown precipitate is then treated in this dilute acid with 130 parts of sodium bisulfite which has been dissolved in water. The mass is brought to the boil, further diluted with 8,000 parts of cold water, filtered and washed acid free.

The product consisting of a blue-black paste forms a blue-black powder when dried. It is soluble in 95% sulfuric acid with a brown color and in weak oleum with a green color. It may be methylated according to the procedure outlined in U. S. Reissue 16,426, giving good yields of a dyestuff which gives a claret color in sulfuric acid, when isolated from the nitrobenzene methylation mass by cooling and filtering. The purity of the dyestuff may be enhanced by recrystallization from sulfuric acid, or by a vatting procedure.

The oxidation should be carried out in sulfuric acid concentration of from 88 to 93%. Higher concentrations of acid tend to give a more reddish-blue dyestuff which is not desirable, while the oxidation cannot be satisfactorily carried out in lower acid concentrations at the temperatures required by this process.

The temperatures used may range from about 0 to 25° C., the preferred temperatures being from 5 to 20° C. Higher temperatures with the concentration of acid employed tend to form large amounts of by-products which are obtained in the process of U. S. Reissue 16,426, the formation of which materially decreases the yield of the desirable dyestuff.

The isodibenzanthrone may be suspended directly in the sulphuric acid of the specified strength or it may be dissolved in more concentrated sulfuric acid which, after solution is complete, may be diluted by the careful addition of water, prior to the addition of the oxidizing agent.

The manganese dioxide should be added very slowly over a period of several hours. Equivalent oxidizing agents, such as manganic sulfate may also be used. In place of drowning the reaction mixture in water as described in the above example, the product may be isolated by direct filtration on a suitable filter, whereby purification is effected. The crude product may also be purified by extraction with alkaline solutions or organic solvents. The purity of the desired oxidation product depends to a large extent upon the purity of the isodibenzanthrone employed.

We claim:

1. In the process of oxidizing isodibenzanthrone to dioxy-isodibenzanthrone in sulfuric acid, the steps which comprise carrying out the oxidation in an acid concentration of from 88 to 93% at temperatures of from 0 to 25° C.

2. In the process for preparing dioxy-isodibenzanthrone wherein isodibenzanthrone is oxidized in sulfuric acid with manganese dioxide, the steps which comprise carrying out the oxidation in an acid concentration of from 90 to 93% at temperatures of from 5 to 20° C.

ROBERT FRASER THOMSON.
IAN BLOHM ANDERSON.
SIDNEY THORNLEY.